United States Patent [19]

Congleton

[11] 4,174,150
[45] Nov. 13, 1979

[54] SYSTEM FOR COMBINING LASER BEAMS OF DIVERSE FREQUENCIES

[75] Inventor: Robert S. Congleton, Richland, Wash.

[73] Assignee: Jersey Nuclear-Avco Isotopes, Inc., Bellevue, Wash.

[21] Appl. No.: 883,248

[22] Filed: Mar. 3, 1978

Related U.S. Application Data

[63] Continuation of Ser. No. 660,649, Feb. 23, 1976, abandoned.

[51] Int. Cl.² .............................................. G02B 27/10
[52] U.S. Cl. .................................. 350/174; 250/284; 332/7.51
[58] Field of Search ............... 350/171, 172, 174, 169; 356/106; 250/284; 332/7.51; 330/4.3

[56] References Cited

U.S. PATENT DOCUMENTS

| | | |
|---|---|---|
| 3,521,068 | 7/1970 | Armstrong et al. ............... 350/174 |
| 3,671,747 | 6/1972 | Duguay .............................. 332/7.51 |
| 4,038,549 | 7/1977 | Janes et al. ........................ 250/284 |

Primary Examiner—Jon W. Henry
Attorney, Agent, or Firm—Weingarten, Maxham & Schurgin

[57] ABSTRACT

A system of passive or static optics for combining distinct beams of laser radiation into a number of output beams, each having colinear, superimposed beam components of the original radiation. This system further provides power sharing between the combined beams of the power in the original input beams of laser radiation.

14 Claims, 3 Drawing Figures

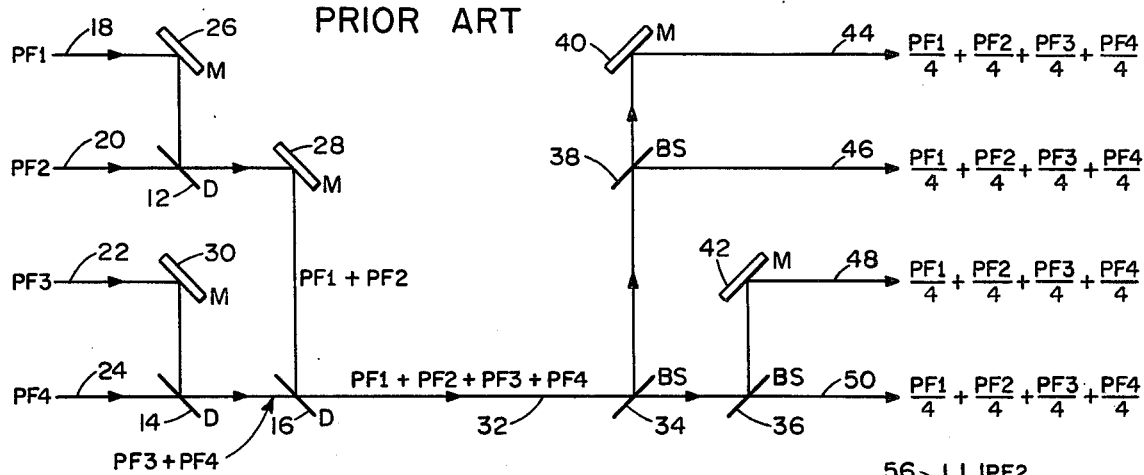
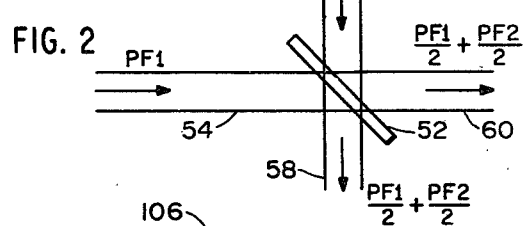
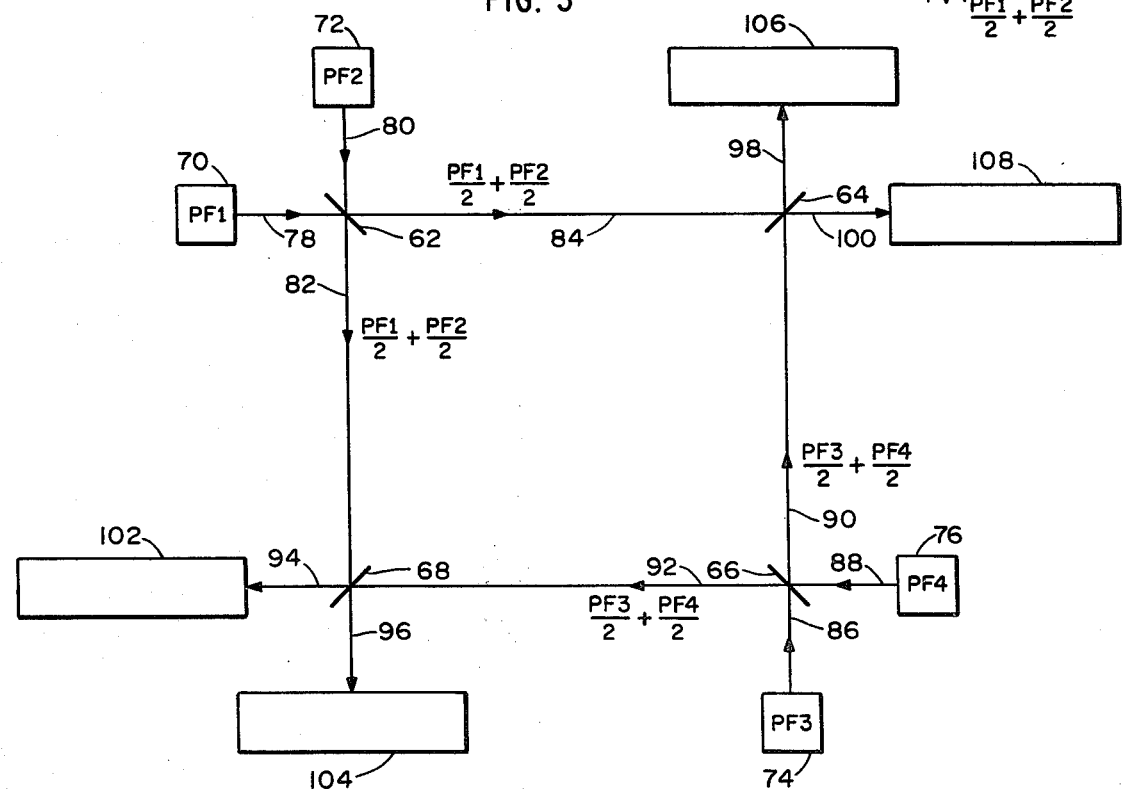

SYSTEM FOR COMBINING LASER BEAMS OF DIVERSE FREQUENCIES

This is a continuation, of application Ser. No. 660,649, filed Feb. 23, 1976 now abandoned.

FIELD OF THE INVENTION

The present invention relates to laser optics and in particular to an optical system for combining laser beams.

BACKGROUND OF THE INVENTION

In isotope separation by isotopically selective photoexcitation of one isotope in an environment of plural isotopes, as for example discussed in commonly assigned U.S. Pat. No. 3,772,519, incorporated herein by reference, it is common to find a plurality of laser beams separately generated. It is desired to combine these into a composite beam having components from each of the separate laser beams. It is known that laser beams, or radiation in general, of differing frequencies in separate beams may be combined onto a single path having co-linear superimposed beams composed of components of each of the original beams by the use of dichroic elements. Additionally, it is known as, for example, discussed in commonly assigned U.S. Pat. No. 3,924,937, that a plurality of laser beams of pulsed radiation having sequentially triggered pulses in each beam may be combined using a system of rotating optics.

For high power applications, the losses inherent in dichroic elements, particularly when combining laser beams of closely spaced frequency, will reduce the efficiency, or power available in the combined beams. Similarly, the use of rotating optics to provide beam combining in the case of time sequenced, pulsed beams while feasible, presents an element of mechanical complexity which it might be preferable to avoid.

BRIEF SUMMARY OF THE INVENTION

In the present invention, an optical system of passive and stationary elements is employed to combine the radiation from a plurality of spacially distinct beams so that a plurality of composite beams result. Each composite beam contains colinear and superimposed beam components from each of the original, distinct laser beams. The system can also provide power splitting of the energy in the distinct beams into the equal components in each of the composite beams so that each component in a single composite beam can represent the same percentage of the energy in the original input beam.

Apparatus for combining the distinct input beams of laser radiation according to the present invention comprises an array of beam splitter elements. Each beam splitter element receives an input laser beam which may be an original, uncombined beam or a beam already possessing components from several beams, and receives this radiation on opposite surfaces at the same location of the beam splitter. Each beam of input radiation will be partially transmitted and partially reflected such that the output beams will include components of each input beam, each component typically representing half of the energy in each input beam. The process may be repeated with other beam splitter elements to combine a greater number of input beams into a corresponding number of output beams each having components from all of the input beams.

BRIEF DESCRIPTION OF THE DRAWING

These and other features of the present invention are more fully set forth below in the detailed description of the preferred embodiment and in the accompanying drawing of which:

FIG. 1 is a diagram of a prior art technique for combining laser beams;

FIG. 2 is a pictorial view of the technique of the present invention for combining two laser beams; and FIG. 3 is a diagram of an array according to the present invention for combining a greater number of laser beams.

DETAILED DESCRIPTION OF THE PREFERRED EMBODIMENT

The present invention contemplates a system of one or more passive, stationary beam splitting elements for combinating the radiation on a plurality of separate, spacially distinct laser beams into combined beams each having components of all of the input laser beams. The use of beam splitters in accordance with the teaching of the present invention permits the realization of a high efficiency beam combining system, particularly for combining beams of different, but only slightly different frequencies. The present invention avoids the losses inherent in the use of dichroic elements for the combination of beams as, for example, shown in another technique in FIG. 1, or the additional elements required with rotating optics.

According to a technique which might be employed to combine beams of laser radiation illustrated in FIG. 1, a set of dichroic elements 12, 14 and 16 may be employed to combine four beams 18, 20, 22 and 24 of laser radiation, each having the same power level P (or different power levels as desired) at distinct frequencies, F1, F2, F3 and F4. Mirrors 26, 28 and 30 are shown in use to direct radiation for proper application to each of the dichroic elements 12, 14 and 16. There results from the system of combining optics, a composite beam 32 combining the components of all of the input beams 18, 20, 22 and 24.

For isotope separation, particularly uranium enrichment, according to the technique shown in the above referenced U.S. Pat. No. 3,772,519, it may then be desired to divide the power in the beam 32 into separate beams having identical spectral content but sharing the power in the beam 32 in order to excite various portions of the uranium vapor simultaneously. A set of beam splitters 34, 36 and 38 are employed with reflecting mirrors 40 and 42 to split the beam onto four separate beams 44, 46, 48 and 50, each having components at the frequencies F1, F2, F3 and F4 and one quarter of the power at each frequency as in the input beams 18, 20, 22 and 24.

In addition to the use of a large number of optical elements for the beam combining and splitting system of FIG. 1, all of which require precise and stable optical alignment, the use of dichroic elements 12, 14 and 16 introduces a significant loss inherent in the dielectric layers particularly where the frequencies F1, F2, F3 and F4 are closely spaced as may be the case where the laser beams are employed in isotope separation.

The same results of combined and power split radiation may be achieved more simply and with less potential energy loss in the incident laser beams using a beam splitter concept as illustrated basically in FIG. 2. As shown there, a beam splitter 52 which is typically 50% reflecting and 50% transmitting and typically consisting of a multilayer dielectric element (or thin metal film element) is provided to receive radiation in input laser beams 54 and 56 on opposite surfaces. The fabrication of such a beam splitter is well known in the art. The radiations in the beams 54 and 56 are of different frequencies, F1 and F2, which may be selected for producing excitation of an isotope between different energy states in a process of isotopically selective ionization as described in the above-referenced U.S. Pat. No. 3,772,519 incorporated herein by reference. The power, P, in each beam is typically the same, but need not be so. The radiation in the beam 54 having a power, P, is divided between the output beam 58 containing one half of the power, P, and an output beam 60 containing the other half of the power, P, in the beam 54. The beam 58 will also contain a component of transmitted energy from the input beam 56 and the output beam 60 will contain a component of reflected radiation from the input beam 56, each at a power level of one half P.

The two output beams 58 and 60 will each contain equal components of the radiation in the input beams 54 and 56, typically half the power in each input beam. Each component in the output beams 58 and 60 will be completely superimposed upon and colinear with the other beam and only slightly displaced therefrom due to the dispersive properties of the beam splitter 52.

A beam splitter array for combining and power splitting a multiplicity of input beams as might be used in isotope separation is more completely illustrated in FIG. 3. As shown there, the array consists of four beam splitter elements 62, 64, 66 and 68 positioned to combine the output radiation of four lasers 70, 72, 74 and 76, each of different frequencies, F1, F2, F3 and F4. While shown for use with four lasers, the array of FIG. 3 may be employed with a lesser number, such as three, as desired.

The radiation from the lasers 70 and 72 is applied to opposite surfaces of the beam splitter 62 as input beams 78 and 80. The resulting output beams 82 and 84 each have component beams at the frequencies F1 and F2 at half the power level, P, of the original input beams 78 and 80. Similarly, the radiation from the lasers 74 and 76 are applied as input beams 86 and 88 to opposite surfaces of the beam splitter 66 to provide resultant output beams 90 and 92. The beams 82 and 92 are directed toward beam splitter 68 on opposite surfaces for combining into beams 94 and 96. Beams 84 and 90 are directed toward beam splitter 64 on opposite surfaces for combining into output beams 98 and 100.

Each of the four output beams 94, 96, 98, 100 contains a quarter of the power of each input beam 78, 80, 86, 88 and thus is a composite beam containing each of the colors or frequencies generated by the lasers 70, 72, 74, 76. No elements except four beam splitters are required for this exemplary system and these may be made to operate with very low losses.

The four output beams 94, 96, 98 and 100 are then advantageously applied through parallel enrichment channels 102, 104, 106, 108 respectively which may be spaced regions of a uranium isotope separation chamber or separate chambers as shown in the above patent or in commonly assigned U.S. Pat. No. 3,939,354, also incorporated herein by reference.

It is intended that extensions and modifications of this preferred embodiment be within the scope of the invention, the foregoing description being only exemplary. Accordingly, the area of invention is to be limited only as defined in the following claims and their equivalents.

What is claimed is:

1. A system for combining laser beams of diverse frequencies into a plurality of beams, each comprising laser radiation having components of each of said diverse frequencies, said system comprising:

a plurality, greater than two, of sources of laser radiation including at least first and second source sets;
said plurality of sources of laser radiation providing repsective input beams of laser radiation of different frequencies;
a first plurality of beam splitting elements positioned to receive on one surface of each radiation input beams from said first source set and to receive on the second surface of each the radiation input beams from said second source set;
said first plurality of beam splitting elements providing a plurality of sets of composite beams of radiation comprising:
 a first set of composite beams including a fraction of the radiation from said first source set superimposed on a fraction of the radiation from said second source set; and
 a second set of composite beams comprising a fraction of the radiation in said first source set superimposed on a fraction of the radiation in said second source set;
a further plurality of beam splitting elements responsive to the plurality of sets of composite beams for providing a set of output beams, each beam thereof having a fraction of the radiation in each of the input beams from said first and second sets of sources.

2. The system of claim 1 wherein the fractions of radiation from each source appearing in said output beams are approximately equal.

3. The system of claim 1 wherein the fractions of beams comprising each of said first and second output beams are colinear.

4. The system of claim 1 wherein said beam splitting element includes a beam splitter.

5. The system of claim 4 wherein said beam splitter includes a multi-dielectric layer element.

6. The system of claim 4 wherein said beam splitter includes a thin metal layer element.

7. The system of claim 1 wherein the power in each of said input beams is approximately equal.

8. The system of claim 1 wherein the power in each of said input beams is different.

9. The system of claim 1 wherein:
said plurality of sources number at least four to provide at least four input beams of laser radiation;
at least two beam splitting elements are provided in each plurality, the first plurality thereof responding to said at least four input beams to provide at least four composite beams each having the radiation from a different combination of two input beams therein and the further plurality of said beam splitting elements responding to the composite beams of said first plurality of beam splitting elements to provide at least four output beams, each having the radiation from all of said at least four input beams therein.

10. A system for combining a multiplicity of beams of laser radiation of diverse frequencies to provide a multiplicity of output beams of laser radiation, each beam including a component beam from each of said plurality of beams of diverse frequencies, said system comprising a multiplicity of beams of laser radiation of diverse frequencies; and a plurality of beam splitter elements which include:
- a first plurality of beam splitters each receiving on different surfaces thereof respective laser radiation from said multiplicity of beams and providing a set of output beams, the output beams from each beam splitter including in combination all of the frequencies of laser radiation applied to the surfaces thereof; and
- a further plurality of further beam splitters each positioned to receive different laser radiation of combined frequencies from a plurality of beam splitters other than said further plurality of beam splitter elements on respective surfaces thereof and to provide a further set of output beams of laser radiation each of the further set of output beams of laser radiation including laser radiation of each frequency in said multiplicity of beams.

11. A static system for combining laser beams from a plurality of sources of laser radiation comprising:
- a plurality, greater than two, of sources of laser radiation each providing a spacially distinct input beam of laser radiation;
- a first plurality of beam splitting elements each receiving on first and second surfaces thereof laser radiation in input beams from corresponding ones of the plurality of laser radiation sources to provide plural respective composite beams therefrom with the composite beams being physically distinct and each containing radiation from different combinations each less than all of said plurality of sources of laser radiation whereby said composite beams contain substantially all of the energy in said input beams;
- a further plurality of beam splitting elements responsive to different combinations of the composite beams from said first plurality of elements for directing separate fractions of the radiation in each input beam along separate paths defining output beams thereby providing in each output beam a portion of the radiation in each of said plurality of input beams.

12. The system of claim 11 further including means responsive to the output beams for separating uranium isotopes.

13. A system for combining laser beams of diverse frequencies into a plurality of beams, each comprising laser radiation having components of each of said diverse frequencies, said system comprising:
- a plurality of sources of laser radiation including at least first and second sources;
- said plurality of sources of laser radiation providing respective first and second input beams of laser radiation of different frequencies;
- at least one beam splitting element positioned to receive on one surface radiation from said first source of said plurality of sources and to receive on the second surface thereof the laser radiation from said second source of laser radiation of said plurality of sources;
- said beam splitting element providing a plurality of output beams comprising:
  - a first output beam including a fraction of the radiation in said first input beam superimposed on a fraction of the radiation in said second input beam; and
  - a second output beam comprising a fraction of the radiation in said first input beam superimposed on a fraction of the radiation in said second input beam; and
- a plurality of parallel channcels of uranium vapor receiving each of said output beams.

14. The system of claim 13 wherein said plurality of parallel channels include an isotope separation chamber.

* * * * *